(12) United States Patent
Rodriguez et al.

(10) Patent No.: US 6,704,034 B1
(45) Date of Patent: Mar. 9, 2004

(54) METHOD AND APPARATUS FOR PROVIDING ACCESSIBILITY THROUGH A CONTEXT SENSITIVE MAGNIFYING GLASS

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 09/671,070

(22) Filed: Sep. 28, 2000

(51) Int. Cl.$^7$ ................................................. G09G 5/00
(52) U.S. Cl. ...................................... 345/860; 345/764
(58) Field of Search ................................. 345/856–866, 345/157–160, 764–767; 715/501.1, 512, 513

(56) References Cited

U.S. PATENT DOCUMENTS

| | | |
|---|---|---|
| 4,757,311 A | 7/1988 | Nakamura et al. |
| 4,941,195 A | 7/1990 | Tanaka et al. |
| 5,565,888 A | 10/1996 | Selker |
| 5,731,805 A | 3/1998 | Tognazzini et al. |
| 5,754,348 A * | 5/1998 | Soohoo ........................ 359/802 |
| 5,835,923 A | 11/1998 | Shibata et al. |
| 5,841,420 A * | 11/1998 | Kaply et al. ................. 345/421 |
| 5,936,625 A | 8/1999 | Kahl et al. |
| 5,969,706 A | 10/1999 | Tanimoto et al. |
| 5,990,941 A | 11/1999 | Jackson et al. |
| 6,100,889 A | 8/2000 | Sciammarella et al. |
| 6,230,170 B1 * | 5/2001 | Zellweger et al. ........... 715/512 |
| 6,252,596 B1 * | 6/2001 | Garland ........................ 345/810 |
| 6,331,861 B1 * | 12/2001 | Gever et al. ................. 345/629 |
| 6,535,889 B1 * | 3/2003 | Headrick et al. ........... 707/104.1 |

OTHER PUBLICATIONS

IBM Technical Disclosure Bulletin, *Electronic Magnifying Glasses*, vol. 37, No. 03, Mar. 1994, pp. 353–354.

* cited by examiner

Primary Examiner—Sy D. Luu
(74) Attorney, Agent, or Firm—Duke W. Yee; Jeffrey S. LaBaw; Stephen J. Walder, Jr.

(57) ABSTRACT

A method and apparatus in a data processing system for presenting a set of objects within the data processing system. Responsive to detecting movement of a pointer over an object within the set of objects, an object type is identified for the object. Presentation of the object is then magnified based on the object type.

52 Claims, 9 Drawing Sheets

Shanghai's Oriental Pearl Tower is on the Pudong Side of the Bund, the waterfront along the Haungpu River. It is considered the largest man made structure in Asia. It is also a good example of China's use of modern architecture in Pudong.

FIG. 3D

Shanghai's Oriental Pearl Tower is on the Pudong Side of the Bund, the waterfront along the Haungpu River. It is considered the largest man made structure in Asia. It is also a good example of China's use of modern architecture in Pudong.

METHOD AND APPARATUS FOR PROVIDING ACCESSIBILITY THROUGH A CONTEXT SENSITIVE MAGNIFYING GLASS

BACKGROUND OF THE INVENTION

1. Technical Field

The present invention relates generally to an improved data processing system and in particular, to a method and apparatus for presenting information in a data processing system. Still more particularly, the present invention provides a method and apparatus for providing a user interface to magnify information based on context.

2. Description of Related Art

An important characteristic of modern computing systems is the interface between a user and the computer. Early interactive interfaces were text based wherein a user communicated with the computer by typing a sequence of characters on a keyboard and the computer communicated with the user by displaying characters on an output device—commonly a display screen. These input characters specified a command to the computer's operating system or to an application program executing on the computer. This command invokes program logic to perform a given operation. Modern computer systems use a image user interface (GUI) to simplify the interaction between a user and a computer. A GUI equipped computer communicates with a user by displaying graphics, including text and icons, on a display screen and the user communicates with the machine both by typing in textual information in response to dialogs and by manipulating the displayed icons with a pointing device, such as a mouse.

Many modern GUIs provide a window environment. In a typical window environment, the image display portrayed on the display screen is arranged to resemble the surface of an electronic "desktop" and each application program running on the computer is represented as one or more electronic "paper sheets" displayed as rectangular regions on the display screen. These rectangular regions are called "windows". Each window may include a multitude of panes, with each pane being an area for a particular type of information (textual, still image, moving image, etc.).

Each window displays information generated by an associated application or system program. Further, several windows may be simultaneously present on the desktop with each containing information generated by a program. A program presents information to the user through each window by drawing or "painting" images, graphics or text within the window. The user also can move a window to a different location on the display screen and change its size and appearance to arrange the desktop in a convenient manner. The user communicates with the program by "pointing at" objects displayed in the window with a cursor controlled by a pointing device and manipulating the objects as desired. In some cases, the program requests additional information from the user in response to a manipulation. This request is presented as a "dialog" that allows the user to provide the requested information to the dialog from the keyboard.

With these windows, information is presented in a image fashion. Text may be presented in different font types and different font sizes between windows and within the same window. For example, one window may represent a browser program used to view web pages from different sources on the Internet. A web page may contain text in different fonts, font sizes, and colors. Comprehension of information through graphic user interfaces may be difficult for users who have disabilities, such as visual or hearing disabilities. For example, for visually impaired users, a need is present to enlarge certain portions of a computer screen, especially portions containing text having a relatively small font size.

Presently, some tools are available for magnifying portions of the screen for a user. These tools, however, typically magnify a portion of the screen without regard to the type of content, including the size of the text or image. In other words, equal magnification is provided regardless of the font size of the text. Further, the magnification is often accomplished using pixel amplification in which pixels are duplicated to create a larger image. This process is performed without changing the resolution, resulting in jagged edges in the text. This type of magnification often does not increase the readability of the text being magnified or the details of the image.

Therefore, it would be advantageous to have an improved method and apparatus for magnifying objects displayed in a data processing system.

SUMMARY OF THE INVENTION

The present invention provides a method and apparatus in a data processing system for presenting a set of objects within the data processing system. Responsive to detecting movement of a pointer over an object within the set of objects, an object type is identified for the object. Presentation of the object is then magnified based on the object type.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
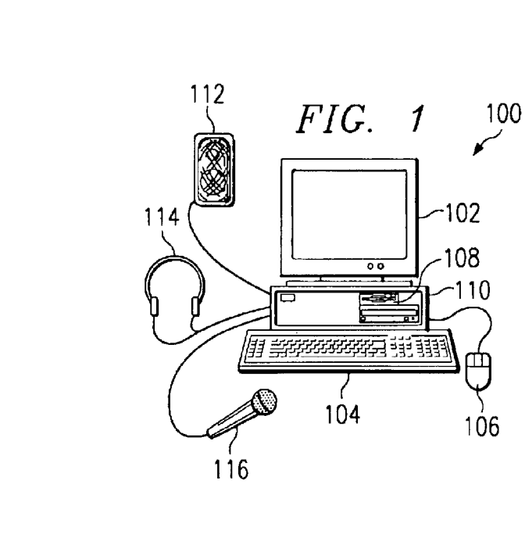
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Input/output devices, such as speaker 112, headphones 114, and microphone 116 are present in personal computer 100. Additional input devices may be included with personal computer 100, such as, for example, a joystick, touchpad, touch screen, trackball, microphone, and the like. Computer 100 can be implemented using any suitable computer, such as an IBM RS/6000™ computer or IntelliStation™ computer, which are products of International Business Machines Corporation, located in Armonk, N.Y. Although the depicted representation shows a computer, other embodiments of the present invention may be implemented in other types of data processing systems, such as a network computer, a handheld computer, or a wireless device. Computer 100 also preferably includes a image user interface that may be implemented by means of systems software residing in computer readable media in operation within computer 100.

Figure 2:
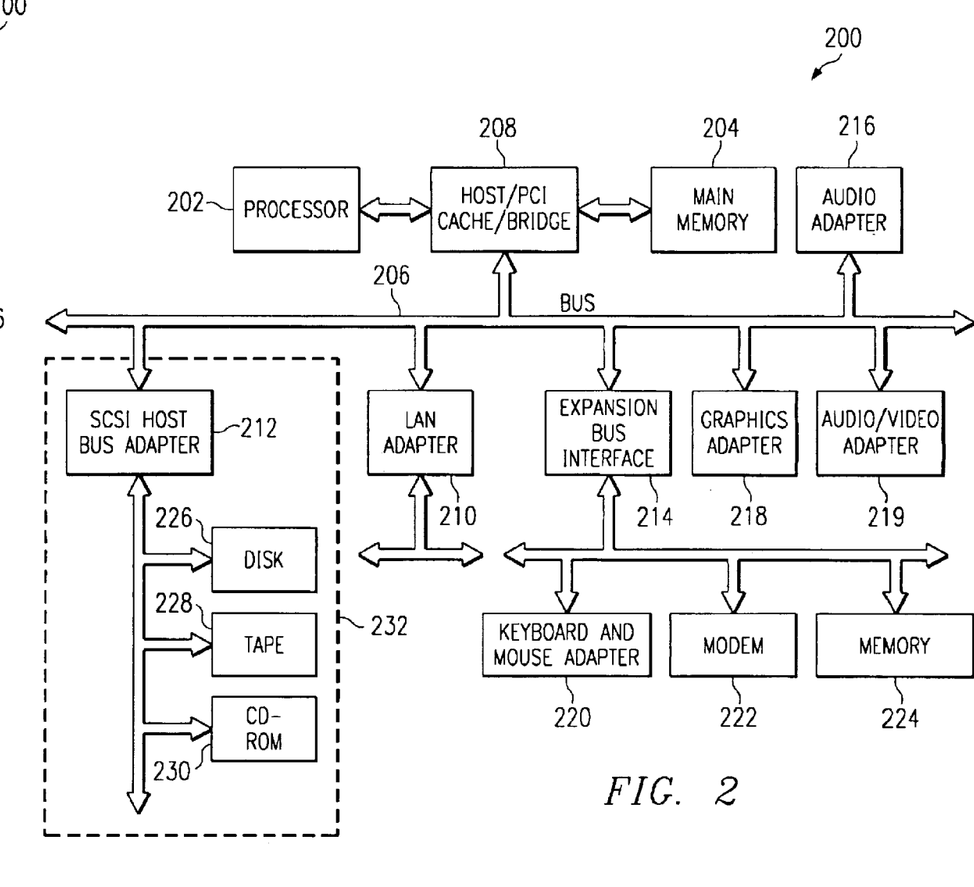
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000™, which is available from Microsoft Corporation. An object oriented programming system such as Java™ may run in conjunction with the operating system and provides calls to the operating system from Java™ programs or applications executing on data processing system 200. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, may include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer implemented instructions for magnifying objects presented in a data processing system based on the context of the objects. In the depicted examples, an object has an object type, such as, for example, a text object, an image object, and an audio object. Theses different object types are examples of different contexts for information being presented in the data processing system. The mechanism of the present invention identifies an object context when the focus on the information being presented changes. The change in focus in these examples is detected through the movement of a pointer on the screen. Typically, a pointer has a hotspot, which is a point or portion of the pointer used to select objects that may be acted upon through user input.

Turning next to FIGS. 3A–3I, windows illustrating context sensitive magnification of objects are depicted in accordance with a preferred embodiment of the present invention. In these examples, two mechanisms are illustrated for magnifying objects. One mechanism involves overlays in which an overlay window containing the magnified object is displayed over the original window. A second mechanism involves reflow in which the text object in the original window is possibly reformatted. The mechanisms for magnifying objects in these examples may be implemented through the operating system, which will provide application programming interfaces (APIs) or directly in an application such as a browser program. Since only the application understands the context, it must provide the magnification or use the APIs provided by the operating system.

Figure 3A:
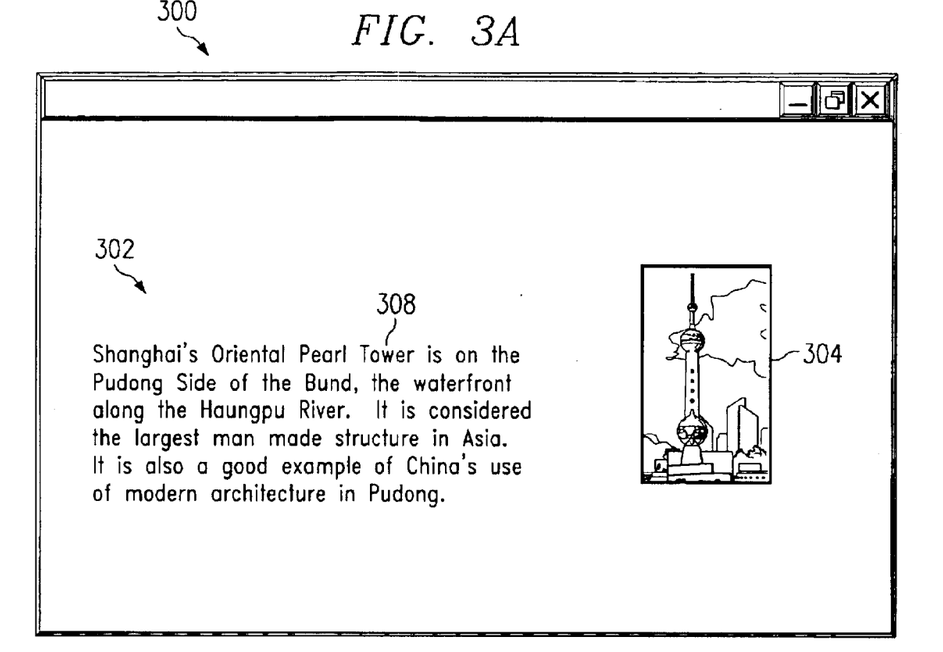
FIGS. 3A–3I are windows illustrating context sensitive magnification of objects in accordance with a preferred embodiment of the present invention.
Figure 3B:
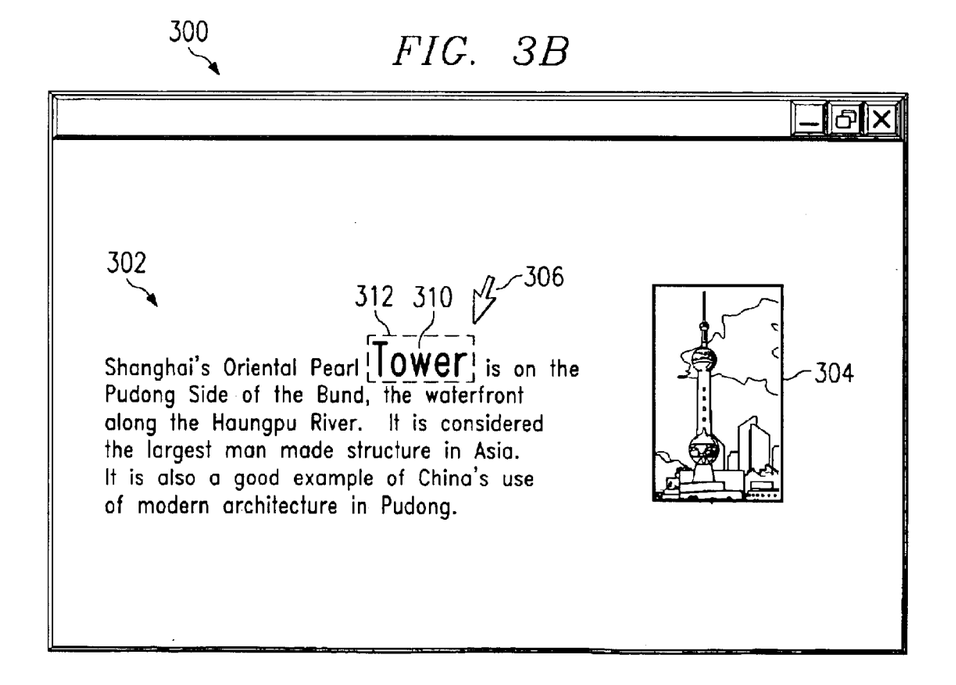

In FIG. 3A, window 300 contains text 302 and image 304. In FIG. 3B, a pointer 306 is moved over word "Tower" 308. The mechanism of the present invention magnifies the word "Tower" as illustrated by word 310. Word 310 is displayed in overlay window 312, which is not shown not seen by the user viewing window 300. The original content is still present, but not seen below the overlay window. Word 310 is presented to the user using a selected font and font size. In these examples, the font size is larger than the original font size for text 302. In this example, a preference has been set such that an object is defined to be a word. Text 302 has an object type of text object in these examples. Of course, other settings may be selected in which the object is, for example, a group of words, a sentence, a line, a part of a line, or a paragraph. In this example, a group of words may be words adjacent to the selected word or some number of words based on a user preference. With respect to the amount of text that is selected to be an object, this text may be defined in a number of ways including using text delineation tags, such as, for example, hypertext markup language (HTML) codes in a browser.

Figure 3C:
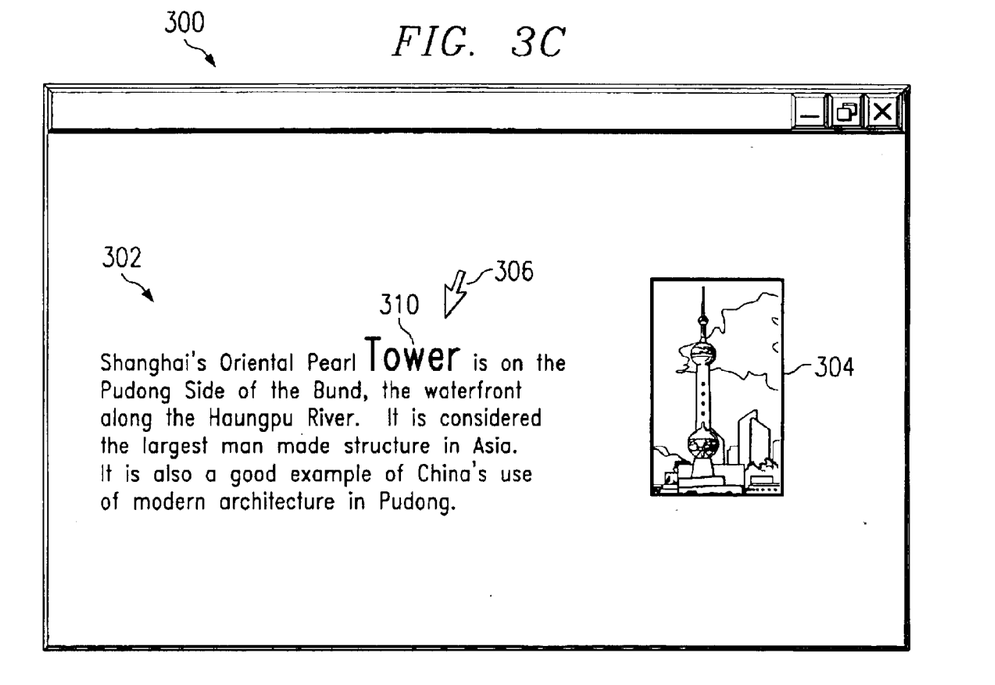
Figure 3D:
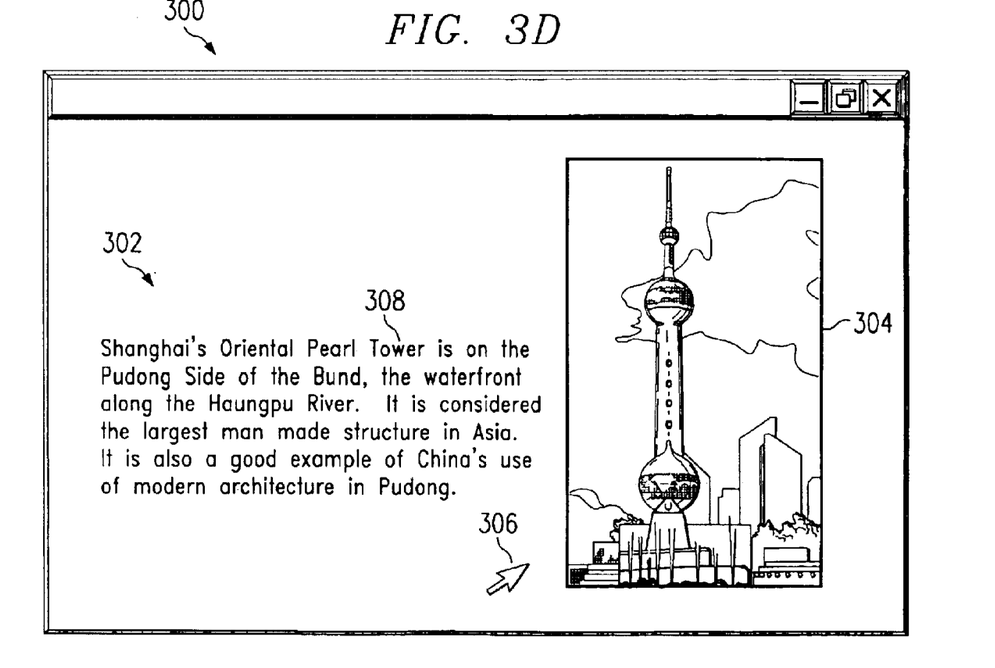

In FIG. 3C, word 310 in text 302 is presented in a larger font size without using an overlay window such as that illustrated in FIG. 3B by reformatting and reflowing the text. Again, the magnification of word 310 occurs when pointer 306 is moved over word "Tower" 308.

Figure 3E:
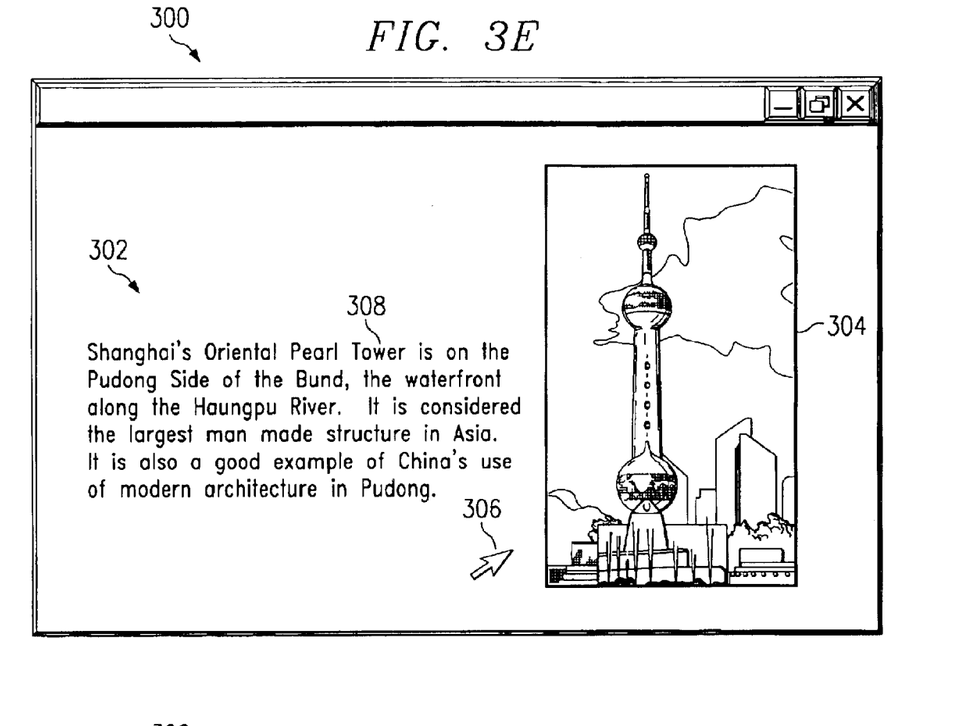

Of course, other types of objects may be selected depending on the implementation. Image 304 also may be an object, which would have an object type of an image object. For example, in FIG. 3D pointer 306 is over image 304, which is presented in a magnified or larger form. In this example, image 304 overlays text 302 because the text is not reformatted in response to the magnification of image 304. In FIG. 3E, text 302 is reformatted to wrap around image 304 in response to image 304 being magnified.

Figure 3F:
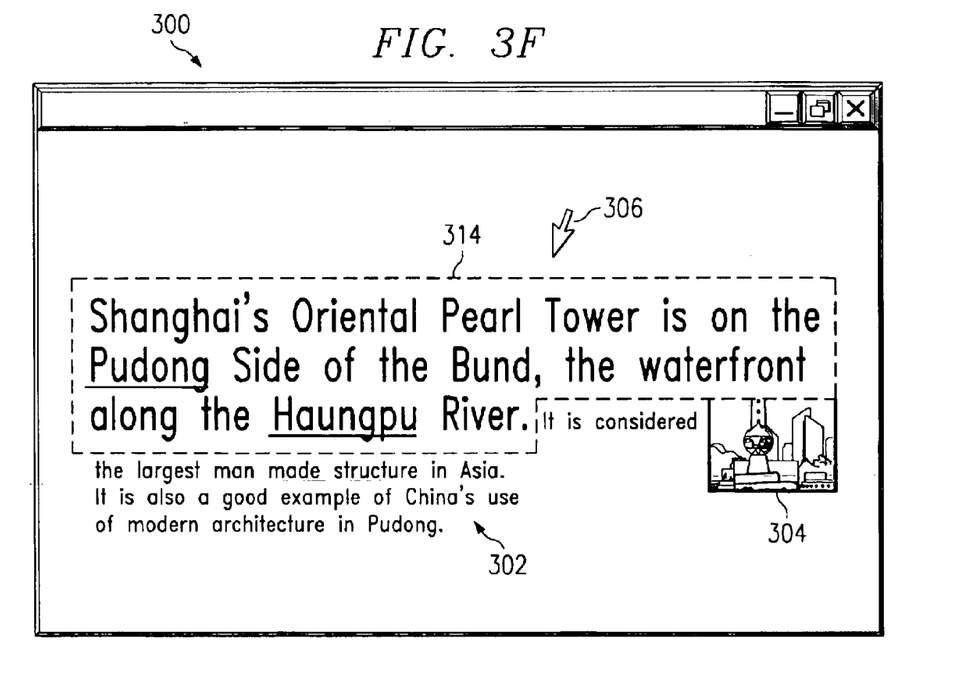
Figure 3G:
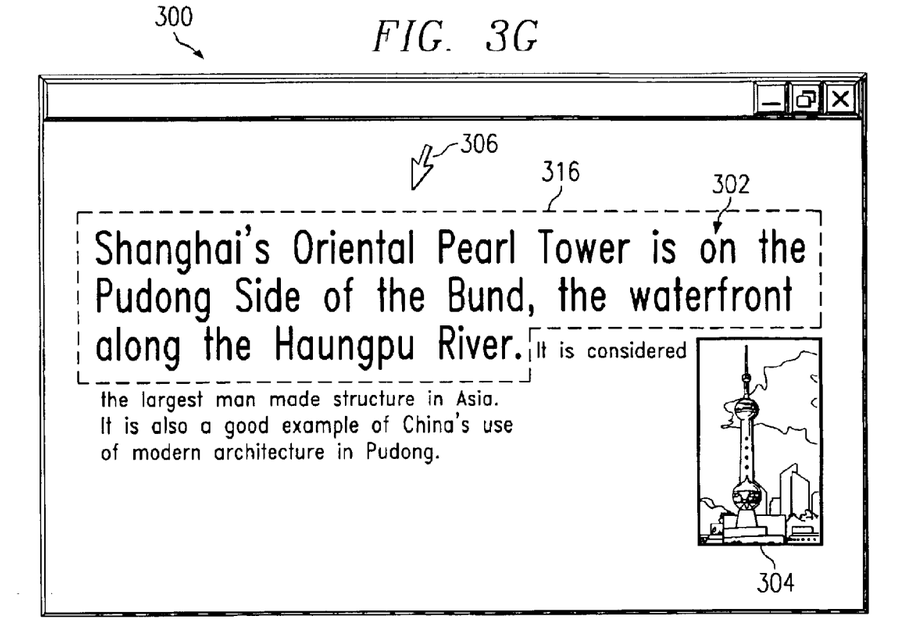

In FIG. 3F, the object is defined to be an entire sentence. Further, in this example, an overlay window 314 is displayed over the original content for text 302 and image 304. Optionally, overlay window 314 may be movable by the user to allow the user to view the magnified content as well as the content in its original form. In FIG. 3G, text 302 has the font size for characters in sentence 316 changed to magnify the presentation of sentence 316 to a user. This magnification occurs whenever pointer 306 points to sentence 316. Further, in this example, text 302 wraps around image 304 to avoid obscuring image 304. Additionally, depending on the particular implementation, a user input requesting magnification may magnify multiple objects based on the object type. This magnification of multiple objects may be, for example, based on the proximity or distance of the objects from the hotspot of the pointer. Each object is magnified based on its object type, such as text or image. An alternate embodiment may select multiple objects for magnification through the use of a combination of keystrokes and mouse pointer location. When multiple objects are magnified simultaneously, each object will have its own magnification window.

Figure 3H:
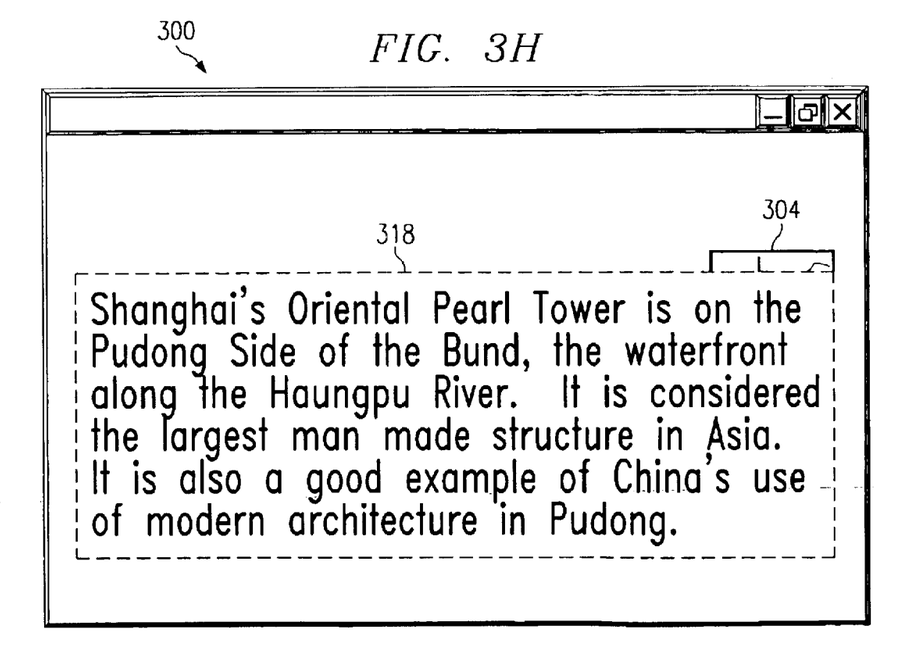
Figure 3I:
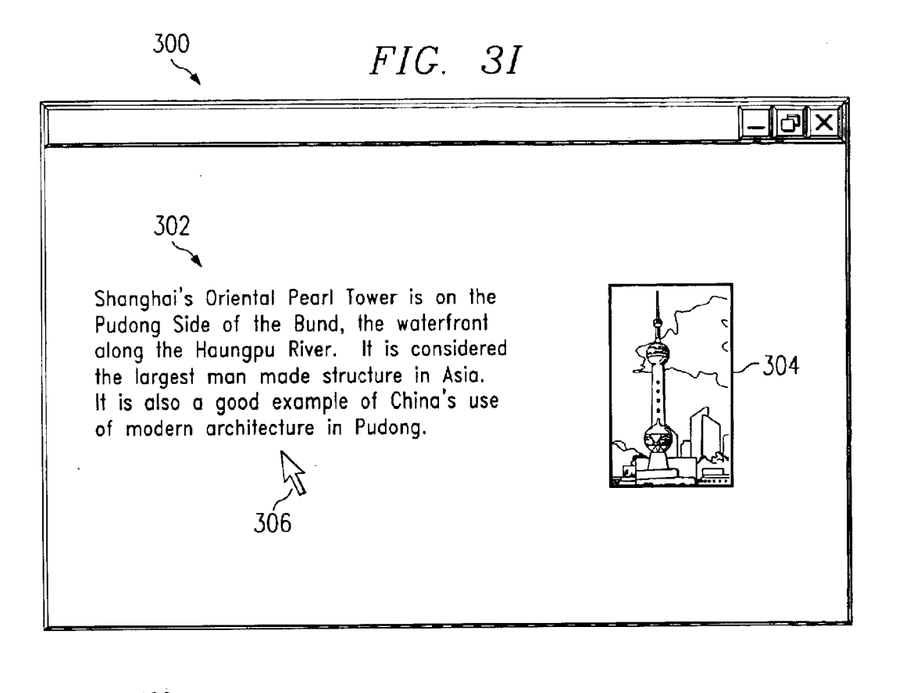

In FIG. 3H, the object is defined to be an entire paragraph. All of text 302 is placed into an overlay window 318 in this example. This overlay window is displayed over the original text and reformatted. As a result, image 304 is obscured by the text in overlay window 318. Next, in FIG. 3I, the text in the original window is reformatted and displayed. In this case, all of text 302 is magnified for presentation to a user. In the depicted examples, this magnification occurs through changing the font size, rather than manipulating pixels through a pixel amplification process.

Figure 4:
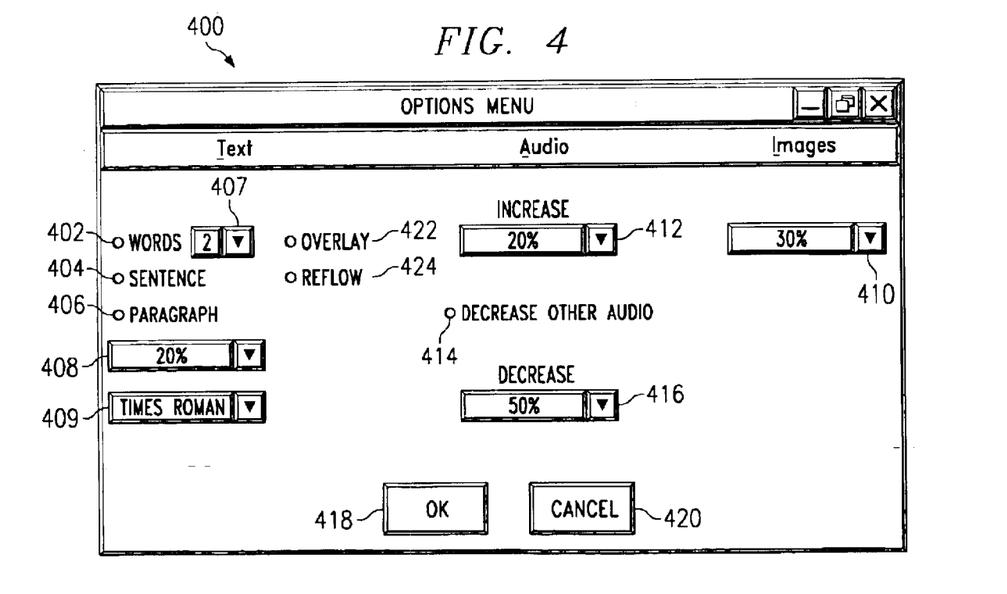
FIG. 4 is a diagram illustrating an options menu for setting preferences used to magnify objects in accordance with a preferred embodiment of the present invention.

Turning next to FIG. 4, a diagram illustrating an options menu for setting preferences used to magnify objects is depicted in accordance with a preferred embodiment of the present invention. Options menu 400 provides different ways to set preferences used to magnify objects having different types of context. In this example, preferences may be set for context having object types of a text object, an image object, and an audio object. With respect to text objects, the text object may be set to be a word or a group of words, a sentence, or a paragraph through selections 402, 404, and 406. Control 407 provides a mechanism to set the number of words in a group. This group may be, for example, one word, three words, or seven words. Based on these selections, a parser process may use the preferences to parse the text to obtain groupings for text objects. Alternatively, a process may be used to add tags to delineate the text objects. The magnification of the object in this example is set through control 408, which allows a font size to be selected for a text object based on a percentage increase. Alternatively, the increase in the size of the text may be set through the use of a point size for the text. This allows a user to set how large text is to be increased by inputting or selecting a percent increase in size for the text. Based on this percentage, a different font is selected for use in displaying the information in the text object. Optionally, a different font type may be selected in addition to the percent change in the size of the text using control 409. In particular, the user may select a font type that is more readable than the current type being used.

Next, control 410 allows input to set an image size for image images as a function of a percentage increase. This presentation requires that the requested bitmap be available for use. With respect to web pages, a server may contain and send different size bitmaps for an image. Alternatively, other formats may be used to transfer images, such as vector graphics, low compression jpeg, medium compression jpeg, and high compression jpeg.

Selections 422 and 424 allow for the magnification to take the form of an overlay or reflow with respect to text objects.

With respect to an audio object, control 412 allows increasing the volume at which an audio object is presented to a user. In this example, the increase is selected as a percentage of the original volume. For example, an audio object of a news broadcast may be increased in volume by twenty percent from the normal setting if a pointer is moved over and selects the audio object. Selection 414 also allows for other audio objects being presented at the same time to be decreased in volume. The percentage decrease is controlled through control 416 in this example.

When selections are to be accepted, then the selection of "Ok" button 418 will save the options selected by the user.

If the options are not to be saved, the selection of "Cancel" button 420 will prevent any changes in the options.

Figures 5, 6, 7:
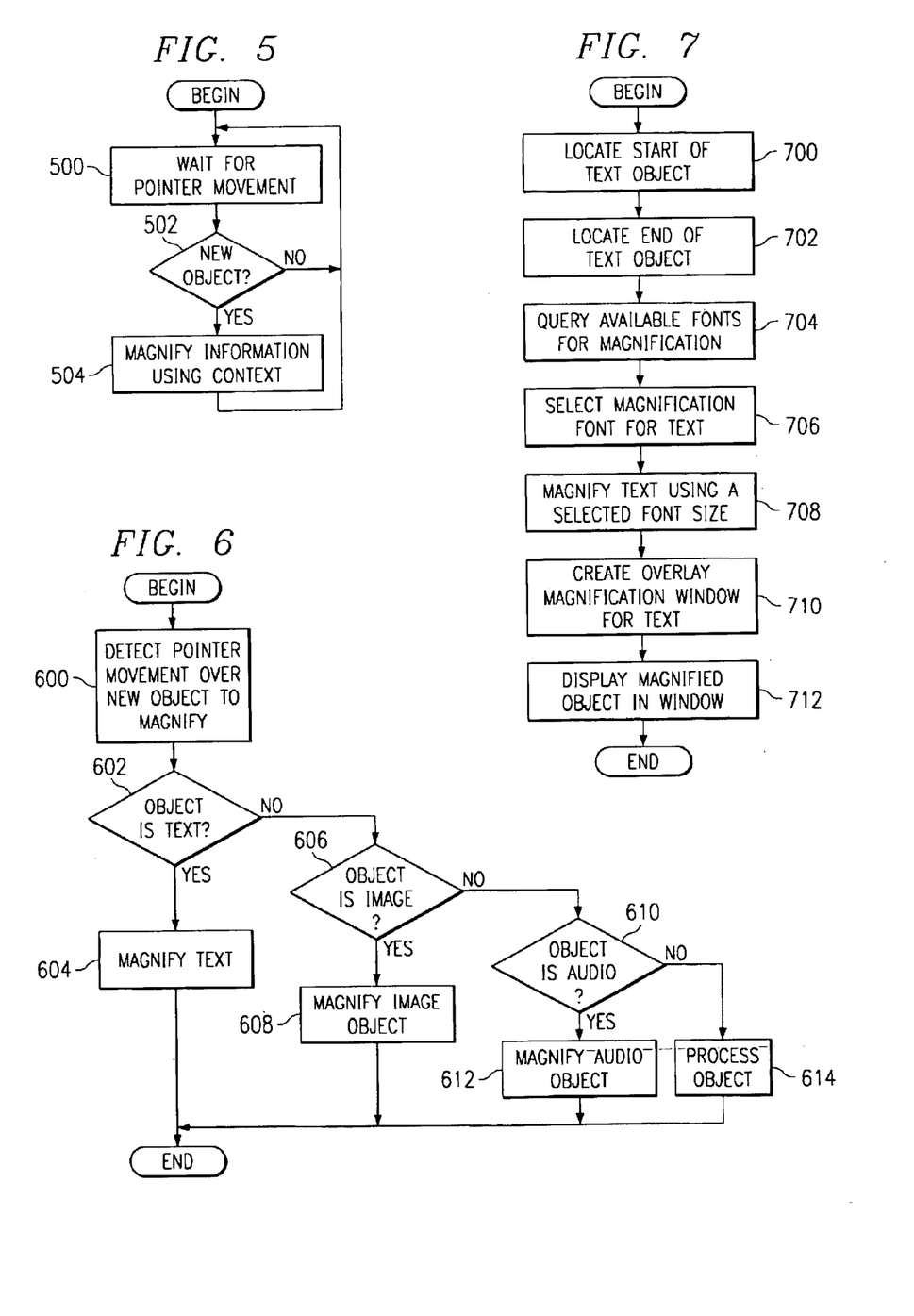
FIG. 5 is a flowchart of a process used for magnifying objects in accordance with a preferred embodiment of the present invention.
FIG. 6 is a flowchart of a process used for selecting an object for magnification in accordance with a preferred embodiment of the present invention.
FIG. 7 is a flowchart of a process used for magnifying text in accordance with a preferred embodiment of the present invention.

Turning next to FIG. 5, a flowchart of a process used for magnifying objects is depicted in accordance with a preferred embodiment of the present invention. The process in FIG. 5 for magnifying objects may be initiated and terminated using a number of different mechanisms. For example, a mouse button or selection of an entry or command from a drop down menu may be used to initiate or terminate the processes.

The process begins by waiting for pointer movement (step 500). Next, a determination is made as to whether a new object is pointed to by the pointer (step 502). This determination may be made using a parsing process that identifies an object to magnify. For example, the process may identify an object to magnify based on selecting one or more objects closest to the hotspot of the pointer. If a new object is pointed to by the pointer, the information in the new object is magnified based on the context of the object (step 504) with the process then returning to step 500. For example, if the context is a text object, the object is magnified by changing the font size and/or font type of the text within the text object. If the object is an audio object, the object may be magnified by increasing the volume at which the audio object is presented. The volume at which other audio objects are being presented also may be decreased.

With reference again to step 502, if a new object is not pointed to by the pointer, the process returns to step 500.

Turning next to FIG. 6, a flowchart of a process used for selecting an object for magnification is depicted in accordance with a preferred embodiment of the present invention.

The process begins by detecting pointer movement over new object to magnify (step 600). Next, a determination is made as to whether the object is text (step 602). If the object is text, the text is magnified (step 604) with the process terminating thereafter. The text may be magnified in a number of ways. For example, the font of the text within the text object may be increased in size and/or the font type may be changed. Alternatively, the original text object may remain intact with a magnified version of the text being displayed over the original text object.

With reference again to step 602, if the object is not text, a determination is made as to whether the object is graphic (step 606). If the object is graphic, the graphic object is magnified (step 608) with the process terminating thereafter. In these examples, the graphic object is magnified by using a bitmap with more pixels. Of course, other mechanisms may be used to increase the size of the graphic object. In these examples, a larger bitmap is used to increase the size of the object without causing the object to become jagged or blurry.

With reference again to step 606, if the object is not graphic, a determination is made as to whether the object is audio (step 610). If the object is audio, the audio object is magnified (step 612) with the process terminating thereafter. The magnification of the audio object is done by increasing the volume of the audio object. Additionally, the volume at which other audio objects are presented may be decreased. This decrease may be performed in place of or in addition to increasing the volume of the audio object.

With reference again to step 610, if the object is not audio, the object is processed (step 614) with the process terminating thereafter. This processing may be a magnification of the particular object type or some other processing of the object depending on the particular implementation.

Turning next to FIG. 7, a flowchart of a process used for magnifying text is depicted in accordance with a preferred embodiment of the present invention. The process illustrated in FIG. 7 is a more detailed description of step 604 in FIG. 6.

The process begins by locating the start of the text object (step 700). Text objects may be identified using a parsing process to group one or more words based on user preferences. Next, the end of the text object is located (step 702). The text object may be, for example, a single word, a sentence, a line, or a paragraph. The available fonts are queried for magnification (step 704). Then, the magnification font is selected for text (step 706). This font list also may include a font size. This selection may be based on a preference set by the user. If none is set by the user or the preferred font is absent, then a default font may be selected. Next, the text is magnified using a selected font size (step 708). In this manner, both the font size and the font type may be changed to increase the readability of the text object. An overlay magnification window is created for the text (step 710). Next, the magnified object is displayed in the window (step 712) with the process terminating thereafter.

Steps 710 and 712 may be replaced by a step in which the font object is presented without an overlay window, in which case the text would-be reflowed (reformatted). An example of overlayed text is shown in FIG. 3F, while an example of reflowed text is shown in FIG. 3G.

Figure 8:
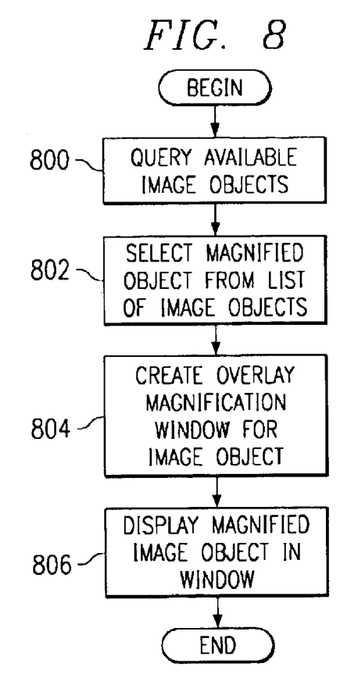
FIG. 8 is a flowchart of a process used for magnifying an image object in accordance with a preferred embodiment of the present invention.

Turning next to FIG. 8, a flowchart of a process used for magnifying an image object is depicted in accordance with a preferred embodiment of the present invention. The process illustrated in FIG. 8 is a more detailed description of step 608 in FIG. 6.

The process begins by querying the available image objects (step 800). Next, the magnified object is selected from a list of image objects (step 802). The list of graphic objects in this example is a set of graphic objects having different bitmap sizes. A graphic object may be selected from this list of objects to be displayed in place of the current graphic object. An overlay magnification window is created for the image object (step 804). Then, the magnified image object is displayed in the window (step 806) with the process terminating thereafter. Text may be overlayed, such as in FIG. 3D or reflowed, such as in FIG. 3E.

Figure 9:
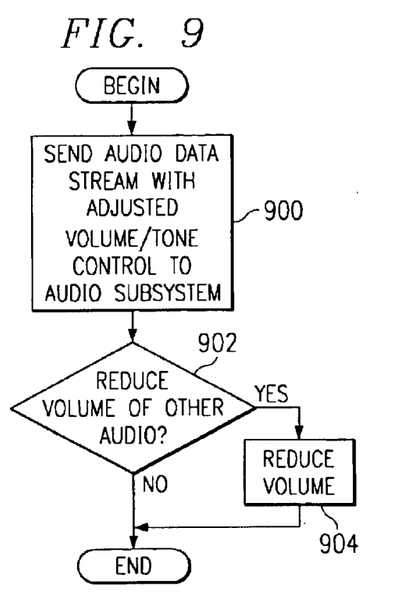
FIG. 9 is a flowchart of a process used for magnifying an audio object in accordance with a preferred embodiment of the present invention.

Turning next to FIG. 9, a flowchart of a process used for magnifying an audio object is depicted in accordance with a preferred embodiment of the present invention. The process illustrated in FIG. 9 is a more detailed description of step 610 in FIG. 6.

The process begins by sending an audio data stream with adjusted volume and tone control to an audio subsystem (step 900). The adjusted volume and tone may be set through user preferences or through default settings. Next, a determination is made as to whether the volume of other audio can be reduced (step 902). If the volume of other audio cannot be reduced, the process terminates. If the volume of other audio can be reduced, the volume is reduced (step 904) with the process terminating thereafter. Step 904 is an optional step. Further, this step may be used in place of step 900 as a mechanism to magnify the presentation of the audio object.

Figure 10:
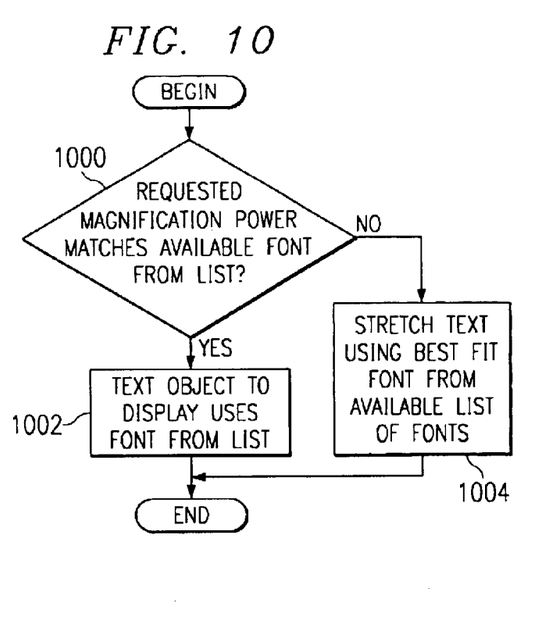
FIG. 10 is a flowchart of a process used for selecting a font type used to magnify a text object in accordance with a preferred embodiment of the present invention.

Turning next to FIG. 10, a flowchart of a process used for selecting a font type used to magnify a text object is depicted in accordance with a preferred embodiment of the present invention. The process illustrated in FIG. 10 provides a more detailed description of step 706 in FIG. 7.

The process begins by determining whether the requested magnification power matches the available font from the list (step 1000). In these examples, the available font may be the same font as in the text object, but using a different font size, such as a default font. If the requested magnification power matches the available font from the list, the text object to display uses the font from the list (step 1002) with the process terminating thereafter.

With reference again to step 1000, if the requested magnification power does not match the available font size from the list, the text is magnified and optionally stretched before rendering using the best fit font from the available list of fonts (step 1004) with the process terminating thereafter. A best fit font is selected if the magnification power selected does not match any existing font available for use. In other words, the font having the closest size to the magnification requested is selected and stretched or compressed before rendering.

In an alternative implementation, if point sizes are selected by a user, the process of the present invention may magnify a text object up to the selected point size. If the text object is already in the selected point size or a larger point size, then no magnification of the text object occurs.

Figure 11:
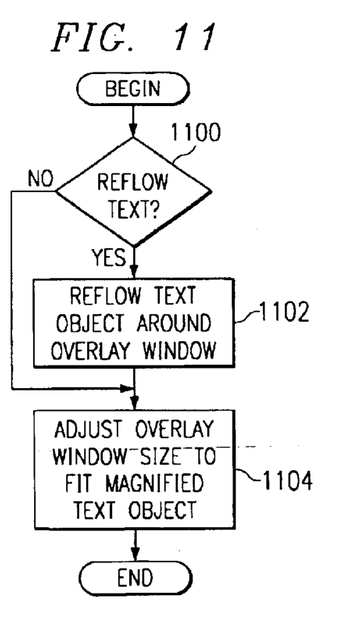
FIG. 11 is a flowchart of a process used for creating an overlay window in accordance with a preferred embodiment of the present invention.

Turning next to FIG. 11, a flowchart of a process used for creating an overlay window is depicted in accordance with a preferred embodiment of the present invention. FIG. 11 is a more detailed description of the creation of an overlay window in step 710 in FIG. 7.

The process begins by determining whether there is to be text reflow (step 1100). If there is to be text reflow, the text object is reflowed around an overlay window (step 1102). Next, the overlay window size is adjusted to fit the magnified text object (step 1104) with the process terminating thereafter.

With reference again to step 1100, if there is not to be text reflow, the process proceeds to step 1104.

Figure 12:
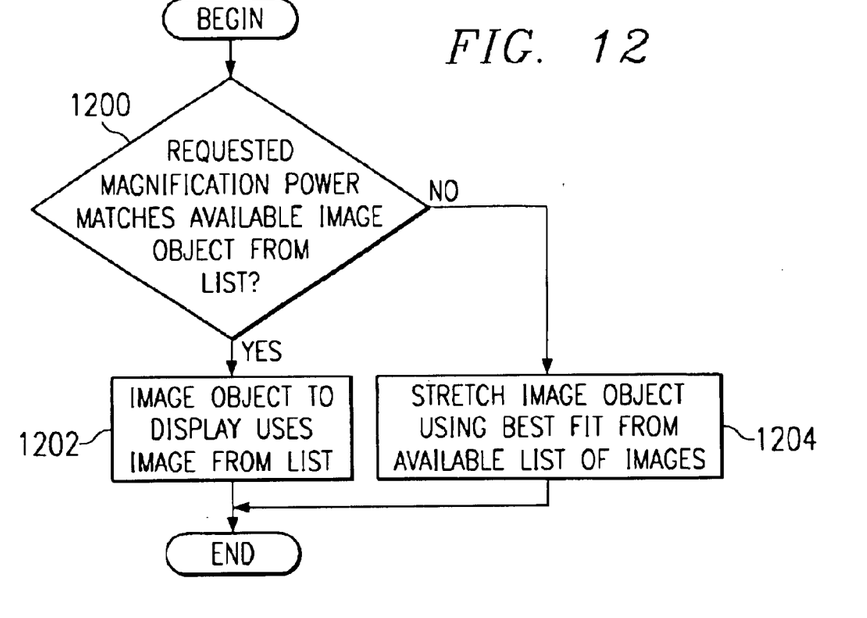
FIG. 12 is a flowchart of a process used for selecting a magnification for an image object in accordance with a preferred embodiment of the present invention.

Turning next to FIG. 12, a flowchart of a process used for selecting a magnification for an image object is depicted in accordance with a preferred embodiment of the present invention. FIG. 12 is a more detailed description of step 802 in FIG. 8.

The process begins by determining whether the requested magnification power matches the available image object from the list (step 1200). The list of image objects may be obtained from various sources. For example, if the original image object is received from a server as an object for display in a web page, the server may be queried to see if additional image objects having different bitmap sizes or resolutions is available. Further, these objects may have been previously received from the server. If the requested magnification power matches the available image object from the list, the image object to display uses the image from the list (step 1202) with the process terminating thereafter.

With reference again to step 1200, if the requested magnification power does not match the available image object from the list, the image object is stretched if a larger image is available using the best fit from the available list of images (step 1204) with the process terminating thereafter.

Figure 13:
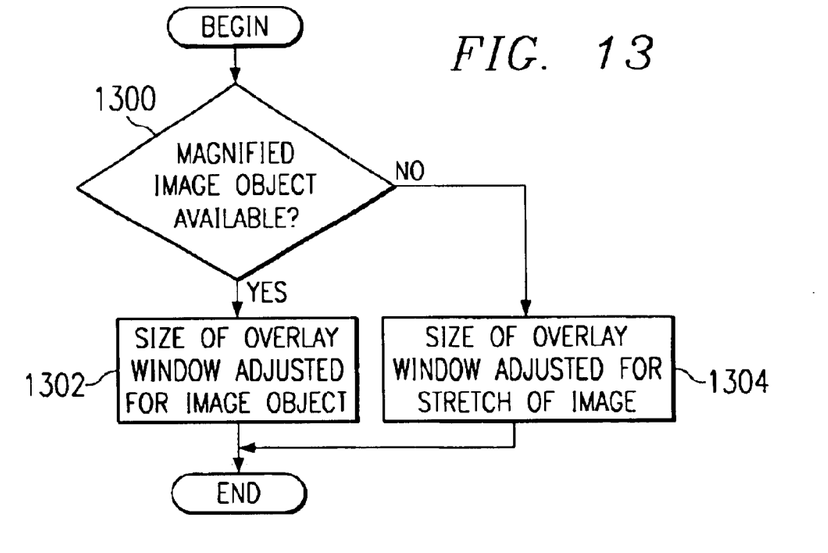
FIG. 13 is a flowchart of a process used for creating an overlay window for an image object in accordance with a preferred embodiment of the present invention.

Turning next to FIG. 13, a flowchart of a process used for creating an overlay window for an image object is depicted in accordance with a preferred embodiment of the present invention. The process illustrated in FIG. 13 is a more detailed explanation of step 804 in FIG. 8.

The process begins by determining whether a magnified image object is available (step 1300). If a magnified image object is available, the size of the overlay window is adjusted for the image object (step 1302) with the process terminating thereafter.

With reference again to step 1300, if a magnified image object is not available, the size of the overlay window is adjusted for stretching of the image (step 1304) with the process terminating thereafter. In this example, stretching involves pixel multiplication of the image object.

Further, the mechanism of the present invention may provide a magnify and scroll feature in which objects may be scrolled and magnified as the pointer moves by the objects. In this manner, objects, such as text, may be magnified and read by a user without the user having to constantly having to move the pointer to the next object.

In addition, other types of mechanisms other than a pointer may be used to change the focus of the magnification. For example, a light pen or voice command system may be used to select objects for magnification. With a voice command recognition system, different text objects may be selected using a voice command, such as, for example, "next sentence" or "next paragraph" to select the next sentence or paragraph for magnification.

Thus, the present invention provides a method, apparatus, and computer implemented instructions for increasing accessibility to different context presented on a data processing system. This mechanism is particularly advantageous for increasing accessibility to information for users with disabilities, such as sight or hearing disabilities. With the mechanism of the present invention, those with different disabilities may have data presented in a manner to facilitate comprehension of the data. In the depicted examples, the context takes the form of text objects, image objects, and audio objects. Of course, the mechanism of the present invention may be applied to other types of context, such as, for example, a video object, and a graphic object. The mechanism of the present invention magnifies or increases accessibility of information based on the context of the information at which a pointer is located. In these examples, the magnification of a text object occurs through changing the font type or font size. Magnification of an image object occurs through presenting an image object having a larger and more detailed bitmap. The presentation of the larger bitmap also may be at a higher resolution. Magnification of an audio object occurs through increasing the volume at which the audio object is presented in these examples. Optionally, the volume at which other audio objects is presented may be decreased in addition to or in place of increasing the volume of the audio object being magnified.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, other types of object types may be processed using the present invention, such as graphic or computer drawn objects. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for presenting a set of objects on a display within the data processing system, the method comprising:

responsive to detecting movement of a pointer over an object within the set of objects, identifying an object for the object, wherein the object type is one of a plurality of object types, and wherein more than one object in the set of objects may have a same object type; and magnifying presentation of the object based on the object type of the object.

2. The method of claim 1, wherein the object type is one of a graphic object, image object, video object, text object, and an audio object.

3. The method of claim 1, wherein the object is a text object and wherein the magnifying step comprises:

selecting a font size for the object; and presenting information in the object using the font size.

4. The method of claim 3, wherein the presenting step comprises:

displaying the information using the font in a window overlaying the object.

5. The method of claim 3, wherein the presenting step comprises:

displaying the object using the font; and reflowing the text in the text object.

6. The method of claim 3, wherein the presenting step comprises:

displaying the object using the font; and displaying the text using the font in an overlay window located over the text object.

7. The method of claim 1, wherein the object is a text object and wherein the magnifying step comprises:

selecting a font type for the object; and presenting information in the object using the font type.

8. The method of claim 1, wherein the object is an image object and wherein the magnifying step comprises:

identifying a magnified version of the image object; and presenting the magnified version of the image object.

9. The method of claim 1, wherein the object is an audio object and wherein the magnifying step comprises:

adjusting a volume at which information in the audio object is presented.

10. The method of claim 9, wherein the adjusting step includes:

reducing a volume at which information from other audio objects are presented while in a magnifying mode.

11. A method in a data processing system for presenting information, the method comprising:

monitoring for a change in focus on the information from a first portion of the information to a second portion of the information;

identifying a context of the second portion of the information, wherein the context is one of a plurality of contexts, and wherein more than one portion of information may have a same context; and magnifying presentation of the information based on the context of the second portion of the information.

12. The method of claim 11, wherein the context of the information is text and wherein the magnifying step comprises:

displaying the text in an increased font size and reflowed.

13. The method of claim 11, wherein the context of the information is text and wherein the magnifying step comprises:

displaying the text in a selected font type and reflowed.

14. The method of claim 11, wherein the context of the information is text and wherein the magnifying step comprises:

displaying the text in an increased font size, wherein the new text is in a window that overlays the text.

15. The method of claim 11, wherein the context of the information is text and wherein the magnifying step comprises:

displaying new text in an different font type, wherein the new text is in a window that overlays the text.

16. The method of claim 11, wherein the context of the information is an image having a first size and where the magnifying step comprises:

displaying the image in a size larger than the first size.

17. The method of claim 11, wherein the context of the information is at least one of textual information, graphic information, image information, video information, and audio information.

18. The method of claim 11, wherein the context of the information is an image having a first bit map size and wherein the magnifying step comprises:

displaying the image using a second bitmap size having more pixels than the fist bitmap size.

19. The method of claim 11, wherein the monitoring step comprises:

determining whether a pointer has moved from the first portion to a second portion of the information.

20. The method of claim 11, wherein the step of magnifying the information is performed selectively such that only a selected context is magnified.

21. The method of claim 20, wherein the selected context is textual information.

22. The method of claim 20, wherein the selected context is image information.

23. A data processing system comprising:

a bus system;

a communications unit connected to the bus system;

a memory connected to the bus system, wherein the memory includes as set of instructions; and a processing unit connected to the bus system, wherein the processing unit executes the set of instructions to identify an object type for an object within a set of objects in response to detecting movement of a pointer over an object within the set of objects and magnify presentation of the object based on the object type of the object, wherein the object type is one of a plurality of object types, and wherein more than one object in the set of objects may have a same object type.

24. The data processing system of claim 23, wherein the bus system is a single bus.

25. The data processing system of claim 23, wherein the bus system includes a primary bus and a secondary bus.

26. The data processing system of claim 23, wherein the processing unit includes a plurality of processors.

27. The data processing system of claim 23, wherein the communications unit is one of a modem or Ethernet adapter.

28. A data processing system comprising:

a bus system;

a communications unit connected to the bus system;

a memory connected to the bus system, wherein the memory includes as set of instructions; and a processing unit connected to the bus system, wherein the processing unit executes the set of instructions to monitor for a change in focus on the information from a first portion of the information to a second portion of the information, identify a context of the information in the second portion, wherein the context is one of a plurality of contexts, and wherein more than one portion of information may have a same context, and magnify presentation of the information based on the context of the second portion of the information.

29. A data processing system for presenting a set of objects on a display within the data processing system comprising:

identifying means, responsive to detecting movement of a pointer over an object within the set of objects, for identifying an object type for the object, wherein the object type is one of a plurality of object types, and wherein more than one object in the set of objects may have a same object type; and magnifying means for magnifying presentation of the object based on the object type of the object.

30. The data processing system of claim 29, wherein the object type is one of a graphic object, image object, video object, text object, and an audio object.

31. The data processing system of claim 29, wherein the object is a text object and wherein the magnifying means comprises:

selecting means for selecting a font size for the object; and presenting means for presenting information in the object using the font size.

32. The data processing system of claim 31, wherein the presenting means comprises:

displaying means for displaying the information using the font in a window overlaying the object.

33. The data processing system of claim 31, wherein the presenting means comprises:

displaying means for displaying the object using the font; and reflowing means for reflowing the text in the text object.

34. The data processing system of claim 31, wherein the presenting means comprises:

displaying means for displaying the object using the font; and second displaying means for displaying the text using the font in an overlay window located over the text object.

35. The data processing system of claim 29, wherein the object is a text object and wherein the magnifying means comprises:

selecting means for selecting a font type for the object; and presenting means for presenting information in the object using the font type.

36. The data processing system of claim 29, wherein the object is an image object and wherein the magnifying means comprises:

second identifying means for identifying a magnified version of the image object; and presenting means for presenting the magnified version of the image object.

37. The data processing system of claim 29, wherein the object is an audio object and wherein the magnifying means comprises:

adjusting means for adjusting a volume at which information in the audio object is presented.

38. The data processing system of claim 37, wherein the adjusting means includes:

reducing means for reducing a volume at which information from other audio objects are presented while in a magnifying mode.

39. A data processing system for presenting information comprising:

monitoring means for monitoring for a change in focus on the information from a first portion of the information to a second portion of the information;

identifying means for identifying a context of the second portion of the information second, wherein the context is one of a plurality of contexts, and wherein more than one portion of information may have a same context; and magnifying means for magnifying presentation of the information based on the context of the second portion of the information.

40. The data processing system of claim 39, wherein the context of the information is text and wherein the magnifying means comprises:

displaying means for displaying the text in an increased font size and reflowed.

41. The data processing system of claim 39, wherein the context of the information is text and wherein the magnifying means comprises:

displaying means for displaying the text in a selected font type and reflowed.

42. The data processing system of claim 39, wherein the context of the information is text and wherein the magnifying means comprises:

displaying means for displaying new text in an increased font size, wherein the new text is in a window that overlays the text.

43. The data processing system of claim 39, wherein the context of the information is text and wherein the magnifying means comprises:

displaying means for displaying new text in an different font type, wherein the new text is in a window that overlays the text.

44. The data processing system of 39, wherein the context of the information is an image having a first size and wherein the magnifying means comprises:

displaying means for displaying the image in a size larger than the first size.

45. The data processing system of claim 39, wherein the context of the information is at least one of textual information, graphic information, image information, video information, and audio information.

46. The data processing system of claim 39, wherein the context of the information is an image having a first bit map size and wherein the magnifying means comprises:

displaying means for displaying the image using a second bitmap size having more pixels than the first bit map size.

47. The data processing system of claim 39, wherein the monitoring means comprises:

determining means for determining whether a pointer has moved from the first portion to a second portion of the information.

48. The data processing system of claim 39, wherein the means of magnifying the information is performed selectively such that only a selected context is magnified.

49. The data processing system of claim 48, wherein the selected context is textual information.

50. The data processing system of claim 48, wherein the selected context is image information.

51. A computer program product in a computer readable medium for use in a data processing system for presenting a set of objects on a display within the data processing system, the computer program product comprising:

first instructions, responsive to detecting movement of a pointer over an object within the set of objects, for identifying an object type for the object, wherein the object type is one of a plurality of object types, and wherein more than one object is the set of objects may have a same object type; and     second instructions for magnifying presentation of the object based on the object type of the object over which the pointer is moved.

52. A computer program product in a computer readable medium for use in a data processing system for presenting information, the computer program product comprising:

first instructions for monitoring for a change in focus on the information from a first portion of the information to a second portion of the information;

second instructions for identifying a context of the second portion of the information, wherein the context is one of a plurality of contexts, and wherein more than one portion of information may have a same context; and     third instructions for magnifying presentation of the second portion of the information based on the context of the second portion of the information.

\* \* \* \* \*